United States Patent [19]
Lange et al.

[11] Patent Number: 6,158,373
[45] Date of Patent: Dec. 12, 2000

[54] TRAVELER CAR WITH RECIRCULATING BALL BEARINGS AND BEARING RETAINER

[75] Inventors: Kenneth E. Lange, Brookfield; Jonathan D. Malcolm, Pewaukee, both of Wis.

[73] Assignee: Harken, Inc., Pewaukee, Wis.

[21] Appl. No.: 09/352,432

[22] Filed: Jul. 13, 1999

[51] Int. Cl.$^7$ .................................... B63H 9/10
[52] U.S. Cl. ........................... 114/204; 114/112
[58] Field of Search ..................... 114/204, 112

[56] References Cited

U.S. PATENT DOCUMENTS

| | | |
|---|---|---|
| 4,144,830 | 3/1979 | McPherren . |
| 4,479,453 | 10/1984 | Bonassi . |
| 4,630,562 | 12/1986 | Grant et al. ............................ 114/39 |
| 4,719,869 | 1/1988 | Harken et al. ......................... 114/102 |
| 4,823,720 | 4/1989 | Foster . |
| 5,127,351 | 7/1992 | Breems . |
| 5,149,059 | 9/1992 | Monahan . |
| 5,546,881 | 8/1996 | Frederiksen ........................... 114/112 |

FOREIGN PATENT DOCUMENTS

| | | | |
|---|---|---|---|
| 979339 | 1/1965 | United Kingdom ................ | 114/204 |

OTHER PUBLICATIONS

Pp. 126–133 from Harken U.S.A. 1998 catalog, showing traveler products; published circa Fall 1997 by Harken U.S.A., Pewaukee, WI.

"Loading Balls" instructions sheet believed to be available circa 1997 with purchase of traveler from Harken U.S.A. Co., Pewaukee, WI.

*Primary Examiner*—S. Joseph Morano
*Assistant Examiner*—Andrew D. Wright
*Attorney, Agent, or Firm*—Pyle & Piontek

[57] ABSTRACT

A traveler comprises a car slideably held on a track, and is useful for applications including trimming a sailboat mast or sail. The car has two side portions each with a race with an open portion. Ball bearings are contained in each race that are rotatably engaged between the race open portions and the grooves on the sidewalls of the track. The car further has retaining means for holding the ball bearings in place along the open portion of the race when the car is removed from the track. The retaining means are movably received by the track groove, and otherwise allow for free rotational engagement of the groove by the bearings.

20 Claims, 7 Drawing Sheets

TRAVELER CAR WITH RECIRCULATING BALL BEARINGS AND BEARING RETAINER

BACKGROUND OF THE INVENTION

This invention relates to a traveler, which is a device generally known in the art as comprising a track mounted on a support and a car slideably mounted on the track.

Travelers are employed on sailing vessels at various locations to assist in the adjustment of sails. Typical locations include mainsheet systems, adjustable genoa lead systems, adjustable spinnaker poles, and mainsail systems using full length battens. These systems are shown and described in current catalogs available from Harken, Inc., Pewaukee, Wis., and on its corresponding website.

In general, a traveler comprises an elongate track and a car slideably mounted for movement along the length of the track. The car is restrained for movement away from the track, usually by overlapping portions in the case of a simple slider or by bearings which engage corresponding grooves in each side of the track. The top of the car usually carries a fitting, such as a strap, to enable attachment of the car to another object, such as a block.

U.S. Pat. No. 4,144,830 discloses a traveler with recirculating ball bearings carried by the car. The ball bearings are installed in an oval cylindrical passage on each side of the car, with the passage being inwardly open to expose a line of balls. The track has V shaped grooves on both sides of the track, and the balls of the car ride along the surfaces of the grooves and prevent upward or downward disengagement of the car from the track.

While the use of recirculating ball bearings provides low friction performance over a variety of conditions, there are several drawbacks in using systems of this nature. Since the exposed line of ball bearings is retained only by virtue of contact with walls of the groove in the track, the car cannot be removed from the track without the bearings falling out and scattering. Installation of a car onto a track presents related problems, with the bearings required to be individually and carefully installed. Presently, the only solution to these problems is to provide a short length of metal or plastic track which is brought into abutting relation with the main track. The car may only be installed and removed from the main track grooves with the aid of this track segment in a tedious procedure that often goes awry, resulting in a loss of bearings.

The problem is additionally compounded when a traveler system is used in connection with a full batten mainsail. In such application, a track is mounted along the length of the back of the mast. The sail has full length battens which extend generally horizontally on the sail. The forward end of each batten carries a fitting which is attached to a car mounted on the track. These systems provide support for the sail and facilitate raising and lowering of the sail.

A difficulty arises if there is a need to remove the sail from the mast. The cars cannot be slid off the bottom end of the track because the bearings will fall out. Therefore, it is necessary to use the special tool described above, or it becomes necessary to disengage each of the cars at their linkage to the battens, either of which is a time consuming and tedious process, particularly on a boat that may be rocking or otherwise unsteady.

Furthermore, in all cases where recirculating ball bearings are employed, it is necessary to secure caps at each end of the track to prevent the car from accidentally sliding off. If the end caps should break or become disengaged, especially while sailing, serious problems can occur.

In view of the above, there is a longfelt and unresolved need in the art to provide a traveler car having a conventional recirculating ball bearing system together with a feature to enable the bearings to be self-contained in the car while still providing full bearing contact with the groove in the track. Such a feature would enable installation and removal of the car on the track without resort to special tools or without concern about loss of the bearings.

SUMMARY OF INVENTION

The present invention is useful for applications in which a sliding member is mounted on a relatively fixed track for linear movement along the track, and in which the sliding member carries a line of exposed ball bearings in bearing engagement with the track. The invention is particularly suitable for travelers having a car and recirculating ball bearings in both sides of the car which bear on grooves in the side of the track.

In the preferred embodiment, the car comprises a main body and a pair of side portions which extend in opposition to V-shaped grooves in the sides of the track. The car side portions contain oval passages, or races, circular in cross section, with the races having an open portion along the side portion facing the track grooves. The race passages are filled with ball bearings that can bear against either of the walls of the V-shaped groove.

In accordance with the present invention, a means is provided for retaining the exposed line of bearings in the open portion of the passage. In the preferred embodiment, a bail, preferably in the form of a length of wire, is secured to extend over the length of the centers of the exposed line of bearings. The ends of the wire bail are secured to the body of the car at a position beyond the ends of the open portion of the bearing race.

In use, the wire is spaced slightly away from the balls and is also spaced away from the center of the V-groove in the track when the car is fitted on the track. In a more preferred embodiment, the V-groove may have an elongated slot at its apex to movably receive the wire. Portions of the ball bearings on each side of the wire continue to be exposed and can freely engage the V-shaped walls of the track. At the same time, the bracket or wire prevents loss of bearings upon removal of the car from the track, so that the bearings remain self-contained in the car, greatly facilitating installation and removal of the car. As required, the bracket or wire can be removed in order to replace worn bearings. The balls can be easily loaded into each race, followed by securement of the bail. Balls may also be removed and inserted by deflecting the bail.

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
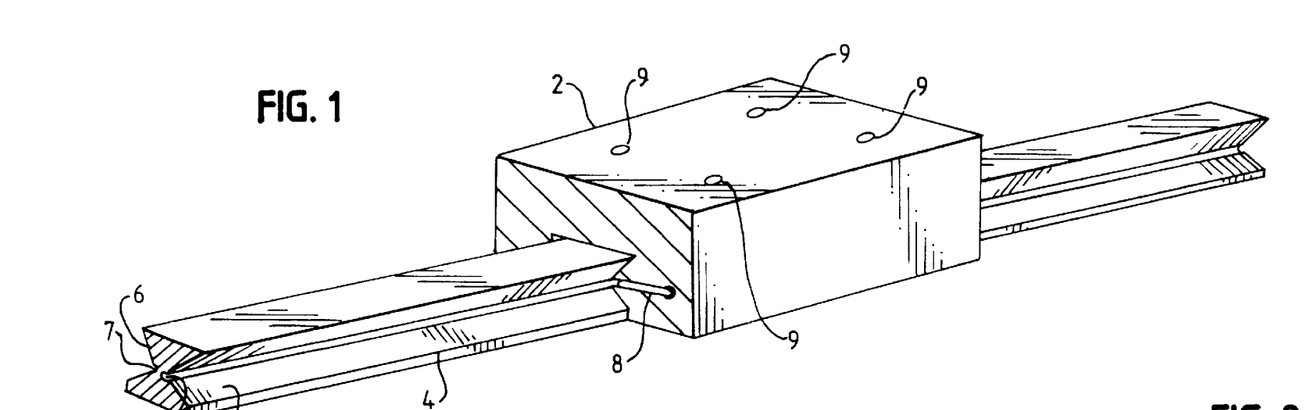
FIG. 1 is a perspective view of a first embodiment of the traveler of the invention.

Turning now to the drawings, FIG. 1 is a perspective view of a first embodiment of a traveler of the invention, comprising car 2 slideably held on track 4. Track 4 has a pair of sides with V-shaped grooves 6 in them with a slot 7 at the apex of the groove. Bearing retaining clip 8 is also shown. Also, FIG. 1 shows mounting holes 9 on car 2 for attachment of auxiliary devices or objects to car 2 as may be desired, such as a strap. Other attachment means for straps or other devices may also of course be comprised.

Car 2 may be used for a variety of applications, including many on a sailboat such as holding a sail in place with track 4 on a sailboat mast. In this example application, as in many others, the load on car 2 will be in a direction away from track 4. For these applications, it is critical that the engaging walls of track 4 have a substantially V-shaped groove as illustrated in FIG. 1. It is further noted that FIG. 1 shows a traveler of the invention with a track of an illustrative length only; the traveler of the invention as defined in the claims appended hereto may comprise shorter or longer lengths of track as may be desired.

Figure 2:
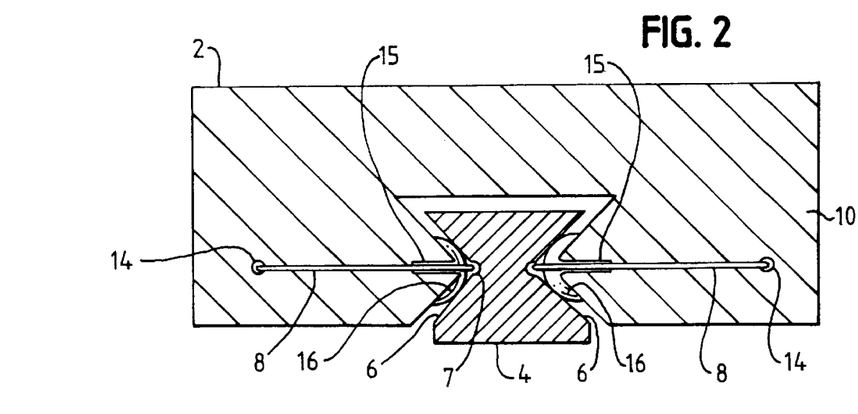
FIG. 2 is an end view of the first embodiment of the traveler of the invention.

FIG. 2 shows an end view of the first traveler embodiment, again with car 2 slideably held on track 4. Endwall 10 has bearing retaining clips 8 removably secured in locking holes 14. Endwall 10 further has guide slot 15 for passing and guiding clips 8. Car 2 has a plurality of ball bearings 16 in bearing engagement with track V-shaped grooves 6. When car 2 is removed from track 4, retaining clip 8 holds balls 16 in place. Retaining clips 8 pass freely through track slot 7, preferably without contact with track 4.

Figure 3:
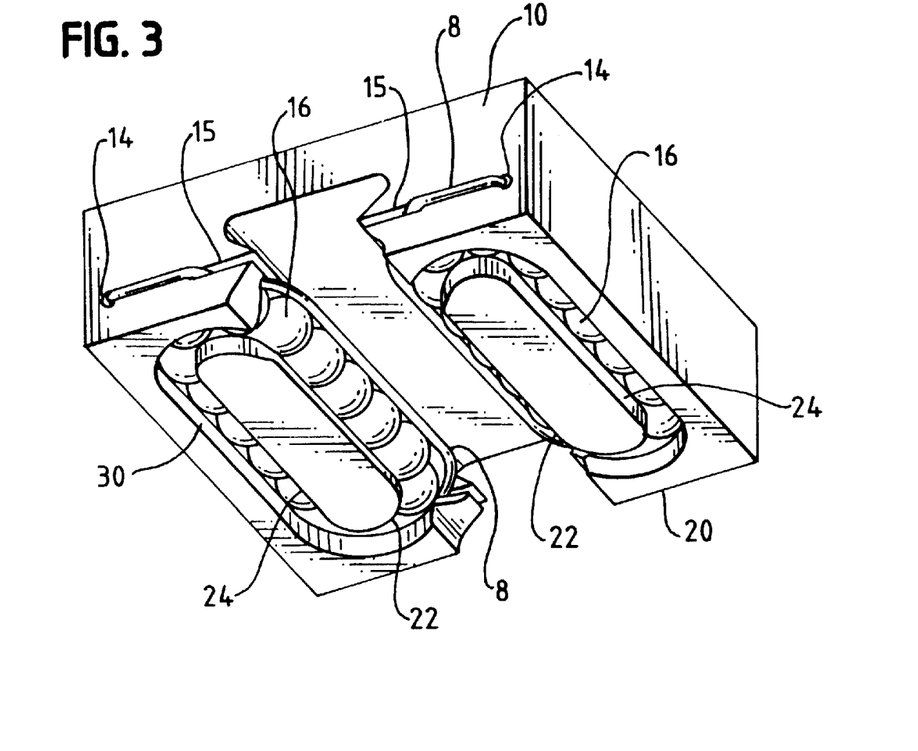
FIG. 3 is a perspective bottom view of the first embodiment of the car of the invention.

FIG. 3 is a perspective view of the bottom and end of car 2 disengaged from track 4. Ball bearings 16 rotate about races 20, which comprise straight open portion 22 and a continuous recirculating portion 24. Race recirculating portion 24 is preferably open to the bottom of car 2 for purposes of bearing 16 lubrication, inspection, and maintenance. It is noted that race recirculating portion 24 and open portion 22 are illustrated having a generally oval shape in FIG. 3; other shapes may be comprised, however, as particular applications may call for. Further, it is likewise noted that race open portion 22 need not be straight, other embodiments may comprise race open portions that are curved, for example. As illustrated in FIG. 3, balls 16 are retained in race straight open portion 22 when car 2 is disengaged from the track by retaining clip 8. Car end wall 10 has locking holes 14 for receiving retaining clip 8 ends to thereby removably secure clip 8 in place. Clip 8 is guided by passing through car end wall guide slots 15 for support.

Figure 4:
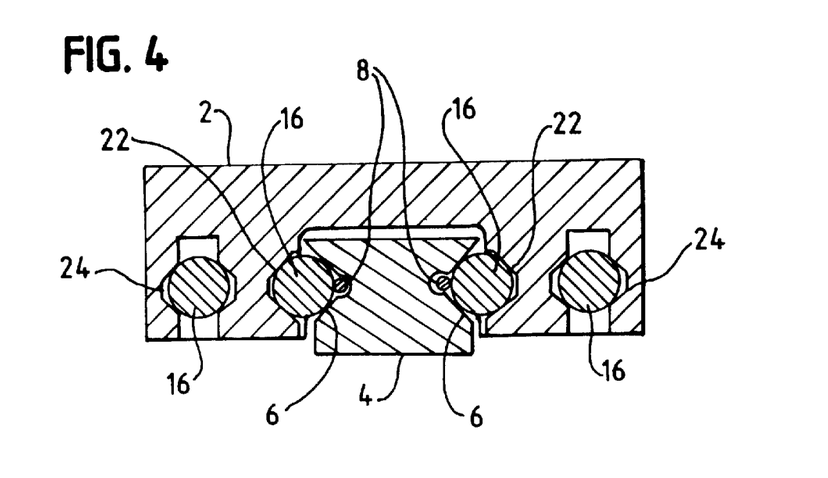
FIG. 4 is a sectional view of the first car embodiment of the invention.

FIG. 4 shows a cross section of car 2 on track 4. Ball bearings 16 are engaged between V-shaped groove 6 and race straight open portions 22. Bearings 16 are retained in race straight open portions 22 by retaining clips 8. Bearings 16 pass to and from race straight open portion 22 through recirculating portion 24.

Figure 5A:
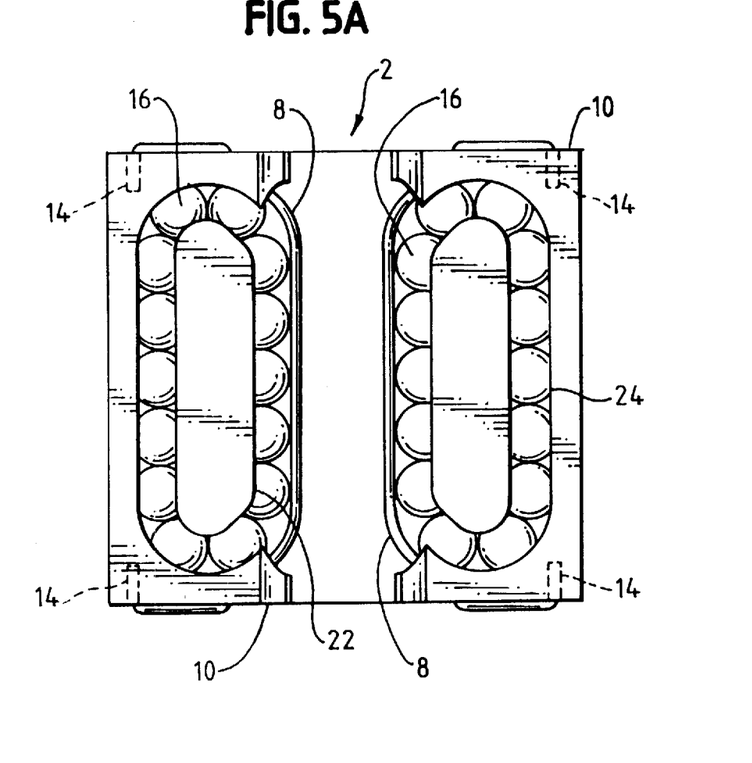
FIG. 5A is a partial sectional view of the first car embodiment of the invention.

FIG. 5A is a bottom partial cross sectional view of car 2, further showing bearings 16 rotating about race straight open portion 22 and recirculating portion 24. Clip 8 retains bearings 16 in straight open portion 22. Endwalls 10 of car 2 are substantially identical. The broken lines of FIG. 5A show the outline of race recirculating portion 24, as well as outlines of clip locking holes 14.

Figure 5B:
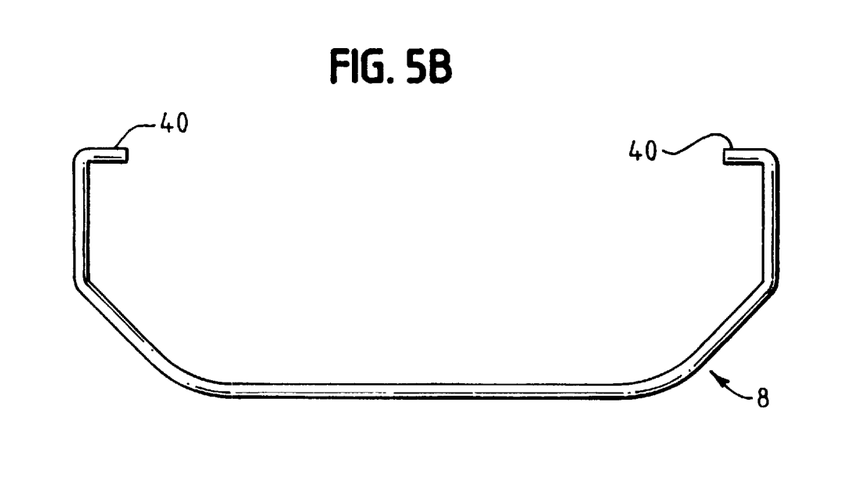
FIG. 5B is a plan view of the retaining clip of the car of FIG. 5A.
Figure 5C:
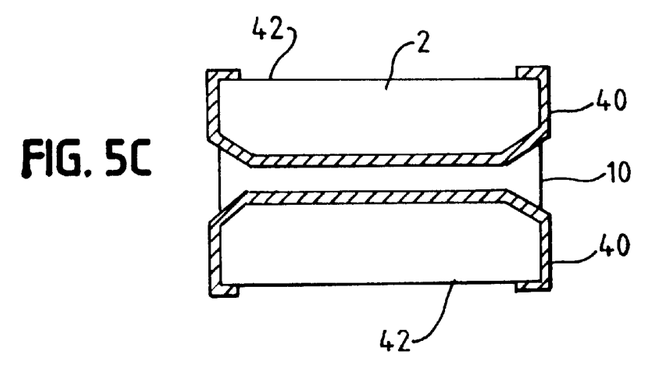
FIG. 5C is a bottom plan view of the car generally shown in FIG. 5A with a second embodiment of a retaining clip of the invention.
Figure 5D:
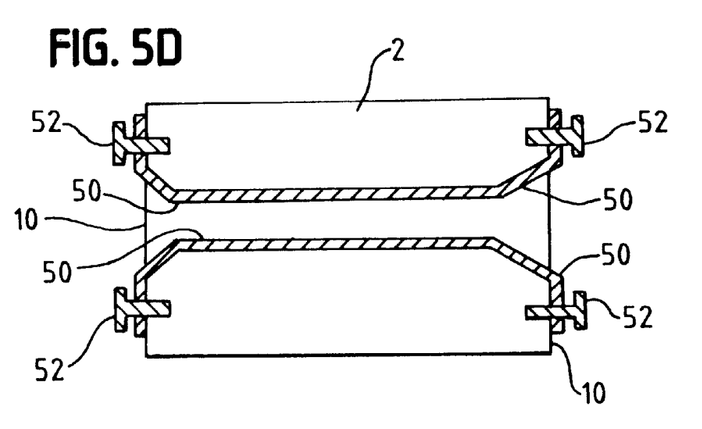
FIG. 5D is a bottom plan view of the car generally shown in FIG. 5A with a third embodiment of a retaining clip of the invention.
Figure 5E:
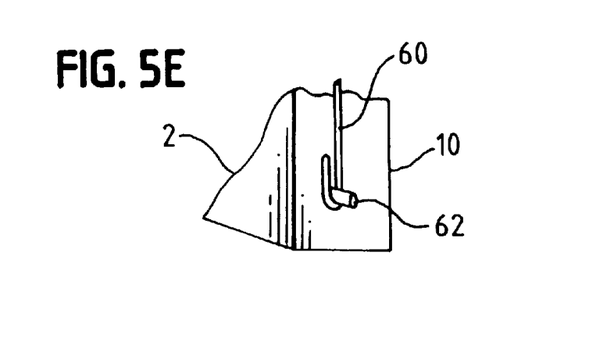
FIG. 5E is a partial perspective end view of a fourth embodiment of a retaining clip of the invention.

FIG. 5B shows a first embodiment of retaining clip 8, as is illustrated generally in FIG. 5A, in greater detail. Clip 8 is preferably comprised of resilient metal, and may be comprised of, for example, wire. Other materials of construction may comprise resilient plastics. Clip 8 has a general U-shape, and has fingers 40 angled approximately 90° degrees for placing in locking holes 14 of car endwall 10 to secure clip 8 in place, as shown in FIG. 5A. FIGS. 5C, 5D, and 5E illustrate other embodiments of the clip and the locking means of the invention. In FIG. 5C, a retaining clip 40 wraps around car endwall 10 to extend over a portion of car sidewall 42. FIG. 5D illustrates retaining clip 50 being removably attached to car 2 by use of locking screws 52 screwed into car endwalls 10. Clip 50 may be wrapped about screw 52, or hooked around screw 52, or held by friction as screw 52 is tightened down on it. FIG. 5E shows a partial perspective view of a retaining clip 60 secured to car 2 by wrapping around locking boss 62 on car end wall 10. Locking boss 62 may comprise an integral part of car 2, or may comprise a pin, plug, or the like that is inserted into a receiving hole on wall 10. Such two piece construction may provide reduced manufacturing effort and cost. It is further noted that combinations of the various retaining clip attachment means and methods as illustrated in FIGS. 5A, 5B, 5C, 5D, and 5E are contemplated; locking screws, bosses, or locking holes, for instance, could be used to fasten retaining clip 40 of FIG. 5C to car sidewall 42. Also, in addition to being comprised of resilient wire, the various clip embodiments of the invention may likewise be comprised of resilient plastic materials, of metal strapping, or of other suitable materials.

Figure 6A:
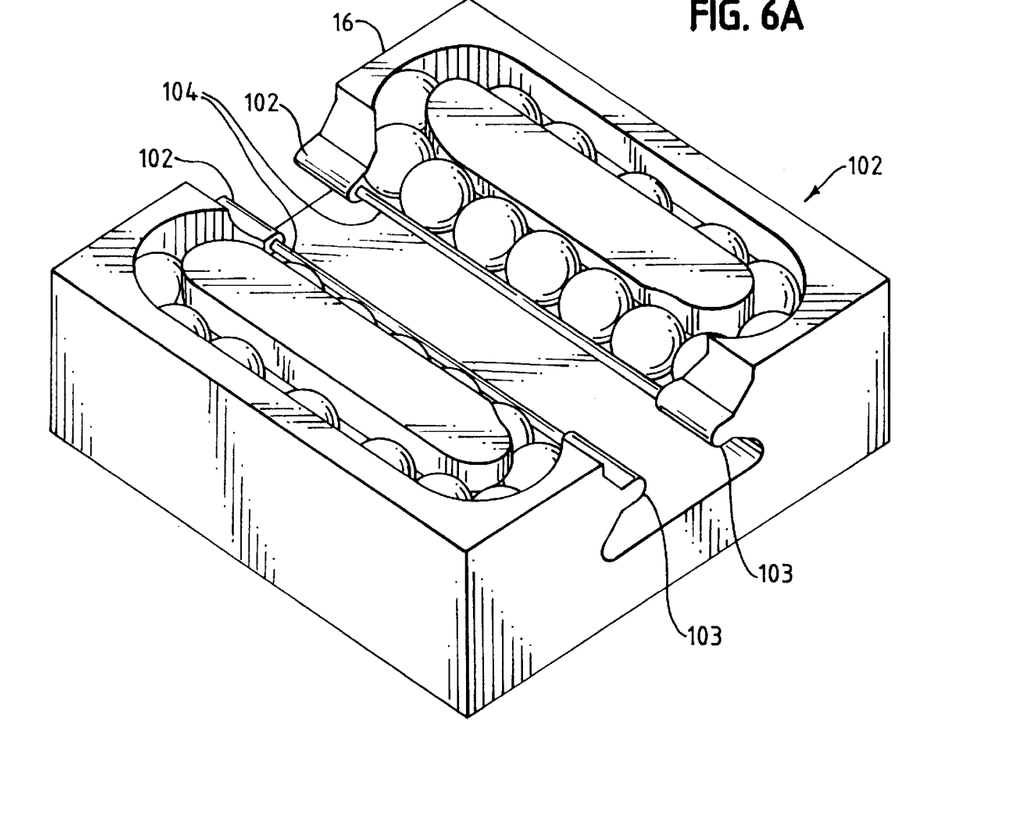
FIG. 6A is a bottom perspective view of a second embodiment of the car of the invention.
Figure 6B:
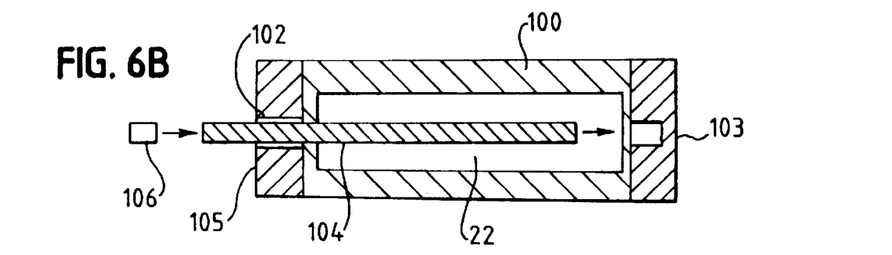
FIG. 6B is a partial cross section view of the lugs of the embodiment of FIG. 6A receiving the retaining clip.
Figure 6C:
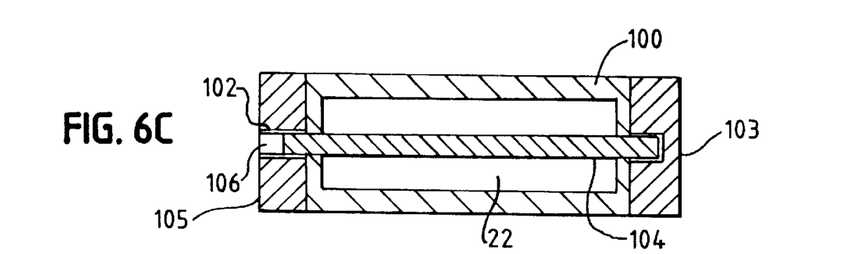
FIG. 6C is a continuation of the illustration of FIG. 6B with the retaining clip locked in place.

FIG. 6A illustrates a perspective view of a second embodiment of a car 100 of the invention. In addition to having many elements in common with car 2 illustrated in previous Figs. and as generally described above, car 100 further comprises projecting lugs 102 and 103 for receiving and removably holding retaining pin 104 in place to retain bearings 16 within race open portion 22. Retaining pin 104 in this embodiment comprises a generally straight member, which may be comprised of metal or plastic. Lugs 102 and 103 each have a hole for receiving an end of retaining pin 104, which may be deflected for insertion into the holes. Or, as illustrated in FIGS. 6B and 6C, lug 102 may comprise a passage 105 for passing pin 104 through, with the first end of pin 104 received and seated in the hole of opposite lug 103. After insertion of pin 104, threaded plug 106 is threaded or otherwise secured in passage 105 to thereby lock pin 104 in place. Since it is not required to be deflected for insertion or removal of bearings, pin 104 in this embodiment may be comprised of substantially stiff, unbending material.

Figure 7:
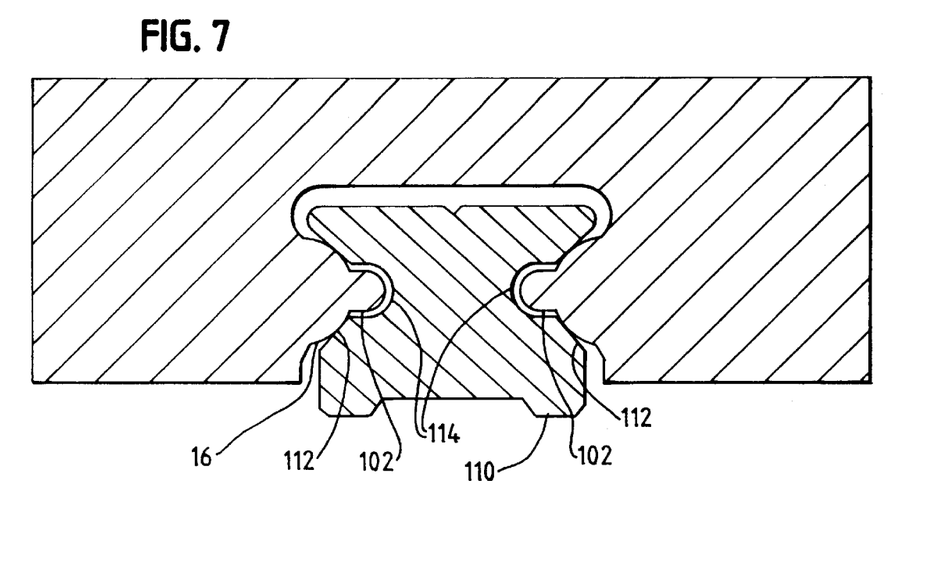
FIG. 7 is an end view of the embodiment of the car of FIG. 6 engaging a track.

FIG. 7 is an end view of car 100 on track 110. Track 110 has converging walls 112 for engaging bearings 16, with elongated slot 114 at their convergence for movably receiving retaining pin 104 of FIG. 6 and projecting lugs 102 and 103.

Figure 8A:
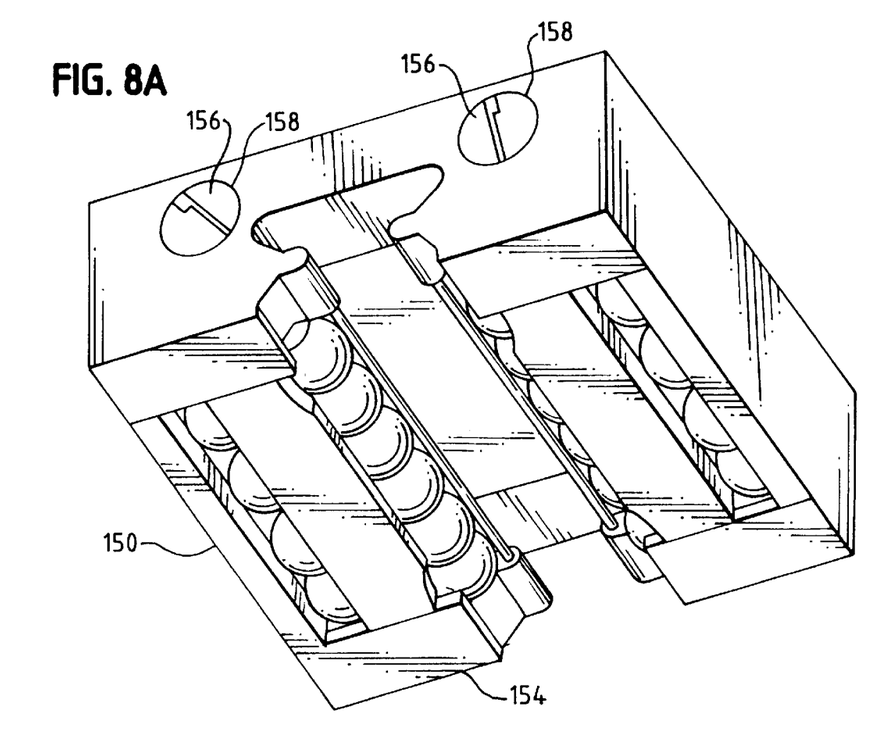
FIG. 8A is a bottom perspective view of another embodiment of the car of the invention.
Figure 8B:
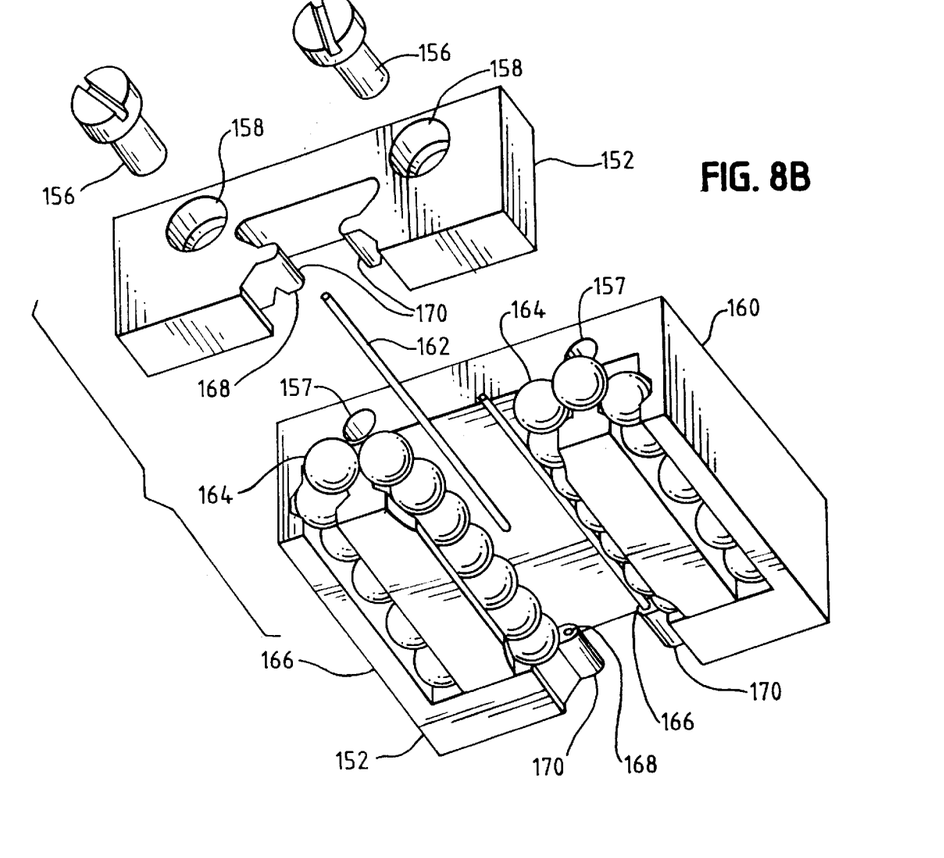
FIG. 8B is a bottom partially exploded perspective view of the car embodiment of FIG. 8A.

FIG. 8A illustrates a bottom perspective view of still another embodiment of the traveler of the invention. In this embodiment car 150 is as generally described herein, except that it comprises removable end plates 152 and 154 which are removably held in place at car ends with locking screws 156 that pass through plate passages 158 to be threadably received by car 150. FIG. 8B is a partially exploded bottom perspective of car 150 with one end plate 152 and set of screws 156 removed from car 150. Threaded receiving holes 157 are shown in car 150 for receiving screws 156. Retaining pin 162 for retaining ball bearings 164 in race open portion 166 is received by holes 168 in lugs 170 on end plates 152. Alternatively, pin 162 may be fixedly attached to one or the other of end plates 152 to be received by the respective other of said end plates 152.

Figure 8C:
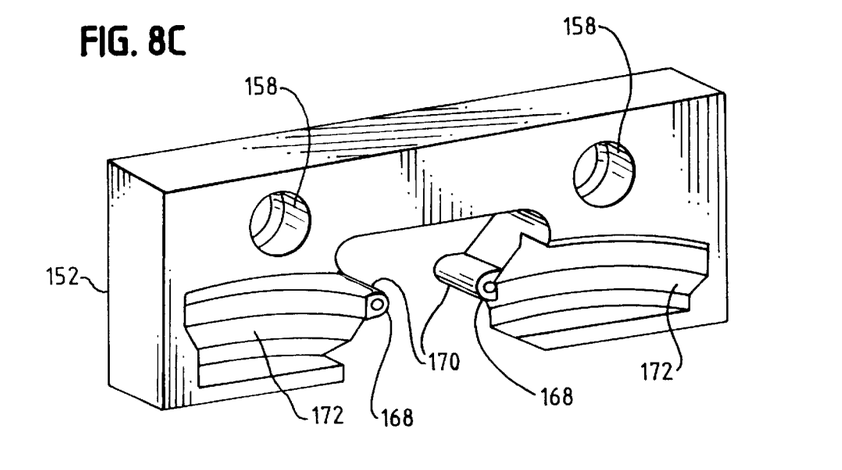
FIG. 8C is a perspective view of the preferred endplate of the car embodiment of FIGS. 8A and 8B.

FIG. 8C shows a perspective view of an end plate 152. As illustrated by FIG. 8C, end plate 152 preferably comprises the outer wall of rounded race end portion 172. This preferred construction allows for reduced machining costs for car 150. FIG. 8C further illustrates passages 158 and lugs 170 with pin receiving holes 168. It is noted that other embodiments of end plates 152 may not comprise a portion of the car race, and may instead comprise end plates operable for removably holding pin 162 in place.

It is further noted that still another embodiment of the car of the invention may comprise retaining means that are integral with the car. This embodiment, for example, may comprise a retaining bridge spanning the race open portion which appears and operates in the same general manner as described above for the retaining clips or pins of the invention.

The advantages of the disclosed invention are thus attained in an economical, practical, and facile manner. While various embodiments have been shown and described, it is to be understood that various further modifications and additional configurations will be apparent to those skilled in the art. It is intended that the specific embodiments herein disclosed are illustrative of the preferred and best modes for practicing the invention, and should not be interpreted as limitations on the scope of the invention as defined by the appended claims. For example, example configurations have been described in association with use of the invention in particular applications on a sailboat. This is not intended to limit the invention as claimed in the appended claims to those applications described. Indeed, one skilled in the art will recognize the value of the invention as applied to a wide variety of other applications both in the field of sailing and elsewhere.

What is claimed is:

1. A Traveler comprising:
 a) a track having a longitudinal groove with converging walls;
 b) a car slideable on said track, said car comprising a bearing race, a plurality of ball bearings in said race, said race having an open portion in which said bearings are removable from said race and are engageable with the walls of the groove, and
 c) retaining means operable against said bearings to retain said bearings in the car within said open portion, wherein said retaining means may be deflected to install or remove said bearings from said open race portion.

2. A traveler as in claim 1, wherein said track has a pair of sides, each of said pair of sides has a said longitudinal groove, and said car has a pair of side portions, each of said pair of side portions has a said bearing race, each of said car side portions in opposition to respective of said pair of track sides with said bearings therebetween.

3. A traveler as in claim 1, wherein said race open portion is substantially straight, and said car further comprises a race recirculating return portion for rotating said bearings to and from said race open portion, and wherein said car has a bottom side, said race recirculating return portion open to said bottom side.

4. A traveler as in claim 1, wherein said retaining means comprises a retaining clip, said retaining clip extending at least over said race open portion, said clip having ends attached to said car, said clip comprised of a material selected from the group consisting of resilient plastic and metal.

5. A traveler as in claim 4, wherein said track groove has substantially V-shaped walls, said retaining clip separated from the convergence of said V-shaped walls when said bearings engage said V-shaped walls.

6. A traveler as in claim 5, wherein said track longitudinal groove with V-shaped walls has an elongated slot at the convergence of said V-shaped walls for moveably receiving said retaining clip.

7. A traveler as in claim 4, wherein said car further comprises a pair of projecting lugs, one each of said pair of lugs proximate respective ends of said race open portion, said retaining clip comprises a retaining pin member having ends removably received by respective of said pair of lugs.

8. A traveler as in claim 7, wherein one of said pair of lugs has a passage for passing said pin through, and the other of said lugs has a hole for receiving said clip, further comprising a threaded passage plug for removable insertion into said passage to thereby lock said clip in place.

9. A traveler as in claim 7, wherein said track groove has substantially V-shaped walls, an elongated slot at the convergence of said V-shaped walls for moveably receiving said retaining pin and said projecting lugs.

10. A traveler as in claim 4, wherein said car has two end walls, said race open portion extending between said end walls, said end walls each have a guide slot proximate said race open portion for guiding said retaining clip, said retaining clip passing through said guide slots, and said clip having ends removably attached to said end walls.

11. A traveler as in claim 10, wherein said end walls each have locking means for removably locking said retaining clip ends in place.

12. A traveler as in claim 11, wherein said locking means comprise a locking hole, and said retaining clip has a generally U-shape with inward substantially right angled fingers at the ends, said fingers received by said locking holes to removably secure said clip to said car.

13. A traveler as in claim 11, wherein said locking means comprise a locking member for engaging said clip ends, said locking member chosen from the group consisting of a locking screw, a locking hole, a locking boss, and a removable end cap.

14. A traveler as in claim 10, wherein said car further has two opposing sidewalls, and said retaining clip extends over said end walls and has ends removably secured to one of said sidewalls.

15. A traveler as in claim 1, wherein said retaining means comprises an elongate thin member integral with said car, said member spanning said race open portion, said track groove having a slot for movably receiving said elongate member.

16. A traveler as in claim 1, wherein said car further comprises removable end plates, said retaining means comprises a retaining pin spanning said race open portion, said pin having ends removably received by respective of said end plates.

17. A traveler as in claim 16, wherein said end plates removably attached to said car by screws, and wherein said end plates have lugs with receiving holes for receiving said retaining pin, said pin spanning said race open portion therebetween.

18. A traveler as in claim 17, wherein said race is substantially oval shaped with rounded end portions, said removable end plates further comprising at least a portion of said race rounded end portions.

19. A traveler comprising:
a) a track having a pair of sides with a substantially V-shaped groove in each of said sides;
b) a car slideable along said track, comprising a body having side portions in opposition to said track grooves and spaced therefrom, each of said side portions comprising a ball bearing race having an open engagement portion and a recirculating return portion, a plurality of ball bearings circulating around said open engagement portion and said recirculating portion, said ball bearings engaged between said race open engagement portion and said track V-shaped groove; and
c) a pair of bearing retaining clips, one each of said retaining clips retaining said bearings in each of said race open engagement portions, said retaining clip ends removably secured to said car, said retaining clip movably received by said track V-shaped groove.

20. A sailboat traveler comprising:
a) a track having a pair of sides with substantially V-shaped grooves in said sides, each of said grooves having a center elongated slot at the convergence of the V-shaped groove;
b) a car slideable along said track, comprising a body having side portions in opposition to said track grooves and spaced therefrom, each of said side portions comprising a ball bearing race having a straight open portion and a recirculating return portion, a plurality of ball bearings circulating around said straight open portion and said recirculating portion, said ball bearings engaged between said race straight open portion and said track V-shaped groove, said car having two endwalls with said race extending therebetween, said endwalls each having a guide slot, said race straight open portion and said recirculating portions open to the bottom of the car; and
c) a pair of substantially U-shaped bearing retaining clips, one each of said retaining clips spanning across one each of said race straight open portions thereby retaining said bearings in said race straight open portion, said retaining clips comprised of metal, said retaining clips passing through said endwall guide slots, said retaining clips having ends engaging locking means on each of said car endwalls to removably secure said clip to said car; said retaining clip movably received by said track V-shaped groove center slot.

\* \* \* \* \*